US010203249B2

(12) United States Patent
Chatterjee (10) Patent No.: US 10,203,249 B2
(45) Date of Patent: Feb. 12, 2019

(54) AMBIENT TEMPERATURE SENSING

(71) Applicant: Google Inc., Mountain View, CA (US)

(72) Inventor: Moyukh Chatterjee, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 467 days.

(21) Appl. No.: 14/982,884

(22) Filed: Dec. 29, 2015

(65) Prior Publication Data

US 2017/0184456 A1 Jun. 29, 2017

(51) Int. Cl.
*G01K 1/00* (2006.01)
*G01K 7/00* (2006.01)
*G01K 3/00* (2006.01)
*G01K 1/16* (2006.01)

(52) U.S. Cl.
CPC ..................................... *G01K 1/16* (2013.01)

(58) Field of Classification Search
USPC ................... 374/208, 163, 110, 166
See application file for complete search history.

(56) References Cited

U.S. PATENT DOCUMENTS

| | | | | |
|---|---|---|---|---|
| 3,659,278 A | * | 4/1972 | Jensen | G08B 17/107 250/577 |
| 5,558,436 A | * | 9/1996 | Richards | G01K 1/14 165/257 |
| 5,714,938 A | * | 2/1998 | Schwabl | G08B 17/06 340/584 |
| 2001/0046253 A1 | * | 11/2001 | Schmidt | G01K 1/14 374/150 |
| 2003/0058117 A1 | * | 3/2003 | Mayusumi | G08B 17/06 340/584 |
| 2004/0048308 A1 | | 3/2004 | Barany et al. | |
| 2005/0058179 A1 | | 3/2005 | Phipps et al. | |
| 2009/0243835 A1 | * | 10/2009 | Katou | G08B 17/06 340/521 |
| 2010/0128754 A1 | * | 5/2010 | Jetter | A61B 5/14532 374/110 |
| 2012/0076171 A1 | | 3/2012 | Wu et al. | |
| 2012/0128025 A1 | * | 5/2012 | Huppi | G01K 1/16 374/121 |
| 2014/0112371 A1 | | 4/2014 | Yang et al. | |
| 2014/0112510 A1 | | 4/2014 | Yang et al. | |

FOREIGN PATENT DOCUMENTS

WO 2007084078 A1 7/2007

* cited by examiner

*Primary Examiner* — Mirellys Jagan
(74) *Attorney, Agent, or Firm* — Morris & Kamlay LLP (57) ABSTRACT

A device and system are disclosed for sensing ambient temperature. The device includes a housing having an exterior surface and an interior surface, a channel, formed through an opening in the housing from the exterior surface to the interior surface, a conductive element, thermally responsive to ambient air entering the channel, comprising an external surface and an internal surface, and a sensor situated within the housing and thermally coupled to the conductive element, wherein the sensor determines the ambient temperature of the device based at least on a detected temperature of the conductive element.

28 Claims, 8 Drawing Sheets

AMBIENT TEMPERATURE SENSING

BACKGROUND

Consumer electronics devices often sense ambient temperature using temperature sensors that are partially hidden from view due to industrial design requirements for the devices and other aesthetic concerns. As a result, during operation, these devices heat up inside their housing cavities due to waste heat from the processor and other components operating within the device. This heat buildup within the housing causes the ambient temperature sensor inside the housing to read higher than expected temperatures, resulting in incorrect operation of applications and/or components that utilize the ambient temperature reading.

There are some devices that attempt to compensate for the temperature within the device cavity by algorithmically correcting for the likely higher temperature readings. This manner of correcting may bring the readings closer to the actual ambient temperature, but the algorithm makes assumptions about the effect of the heat within the housing that may not actually be the case at a given time.

In order to protect against over/under correcting, some devices have included additional temperature sensors within the device to provide more accurate inside temperature readings for inclusion in the algorithm that adjusts the ambient temperature readings provided to the processor.

In another method, an electronic device requires the isolation of the sensor from other internal components of the device and includes a large open port in the housing that allows outside air into the port. The sensor is situated within the housing cavity such that the sensor is exposed only to the outside air that enters the port. Industrial design considerations though often times do not allow for there to be open ports on electronic devices due to concerns with items entering in the ports that will cause damage to the electronic device, such as dust, moisture, etc. Also, product design and assembly often will not allow for the sensor to be completely shielded from the internal heat sources.

Another concern for open port systems is that the outside air may not actually flow through the port. In order to accommodate for this, some devices that use an open port have incorporated more than one open port on the device to increase circulation. The inclusion of additional open ports in the housing of a device increases the concerns discussed hereinabove.

Another method used in current electronic devices is to include the temperature sensor in a component that is isolated from the air inside of the device's housing. For example, the temperature sensor may be incorporated in a button that is located outside of the device's housing and, therefore, is exposed to the ambient air via the button. In this example, the effect of the temperature of the air inside the housing is minimal since the sensor is exposed primarily to the material of the button. This method requires the inclusion of an element of the device being outside of the device housing, which does not always meet industrial and/or product design concerns.

BRIEF SUMMARY

According to an embodiment of the disclosed subject matter, a device comprises a housing having an exterior surface and an interior surface, a channel, formed through an opening in the housing from the exterior surface to the interior surface, a conductive element, thermally responsive to ambient air entering the channel, comprising an external surface and an internal surface, and a sensor situated within the housing and thermally coupled to the conductive element, wherein the sensor determines the ambient temperature of the device based at least on a detected temperature of the conductive element.

In a feature of the embodiment, the external surface is exposed to the ambient air of the device, and the internal surface is thermally coupled to the sensor.

In a feature of this embodiment, the conductive element and the sensor are thermally coupled using a thermal adhesive.

In a feature of this embodiment, the conductive element is a metal wedge.

In a feature of this embodiment, the metal is aluminum.

In a feature of this embodiment, the metal is copper.

In a feature of this embodiment, the metal is stainless steel.

In a feature of this embodiment, the sensor is further configured to detect a temperature inside the housing of the device.

In a feature of this embodiment, the ambient temperature is further based on the detected temperature inside the housing of the device.

In a feature of this embodiment, the ambient temperature is used to adjust a power usage of the device.

In a feature of this embodiment, the ambient temperature is used to control an HVAC system.

According to an embodiment of the disclosed subject matter, a system comprises a plurality of a housing having an exterior surface and an interior surface, a channel, formed through an opening in the housing from the exterior surface to the interior surface, a conductive element, thermally responsive to ambient air entering the channel, comprising an external surface and an internal surface, and a sensor situated within the housing and thermally coupled to the conductive element, wherein the sensor determines the ambient temperature of the device based at least on a detected temperature of the conductive element Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Referring now to the drawings, one or more embodiments of the present subject matter are next described. The following description of one or more embodiments is merely illustrative in nature and is in no way intended to limit the invention, its implementations, or uses.

Accordingly, while the present innovation is described herein in detail in relation to one or more embodiments, it is to be understood that this disclosure is illustrative of the present subject matter, and is made merely for the purposes of providing a full and enabling disclosure of the present subject matter. The detailed disclosure herein of one or more embodiments is not intended, nor is to be construed, to limit the scope of patent protection afforded the disclosed subject matter, which scope is to be defined by the claims and the equivalents thereof. It is not intended that the scope of patent protection afforded the present subject matter be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present subject matter. Accordingly, it is intended that the scope of patent protection afforded the present subject matter is to be defined by the appended claims rather than the description set forth herein.

Embodiments disclosed herein may use one or more sensors. In general, a "sensor" may refer to any device that can obtain information about its environment. Sensors may be described by the type of information they collect. For example, sensor types as disclosed herein may include motion, smoke, carbon monoxide, proximity, temperature, time, physical orientation, acceleration, location, entry, presence, pressure, light, sound, and the like. A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a smart home environment as disclosed herein. For example, a sensor may operate as a security sensor when it is used to determine security events such as unauthorized entry. A sensor may operate with different functions at different times, such as where a motion sensor is used to control lighting in a smart home environment when an authorized user is present, and is used to alert to unauthorized or unexpected movement when no authorized user is present, or when an alarm system is in an "armed" state, or the like. In some cases, a sensor may operate as multiple sensor types sequentially or concurrently, such as where a temperature sensor is used to detect a change in temperature, as well as the presence of a person or animal. A sensor also may operate in different modes at the same or different times. For example, a sensor may be configured to operate in one mode during the day and another mode at night. As another example, a sensor may operate in different modes based upon a state of a home security system or a smart home environment, or as otherwise directed by such a system.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor or a sensor device. For clarity, sensors are described with respect to the particular functions they perform and/or the particular physical hardware used, when such specification is necessary for understanding of the embodiments disclosed herein.

As previously described, conventional temperature sensors disposed within electronic devices may be influenced by the surroundings within the device, which can require additional processing within the device, or more complex manufacturing techniques, to address. In contrast, in accordance with an embodiment of an electronic device disclosed herein, a sensor is included within the housing of the electronic device to detect the ambient temperature of the device. An opening is provided in the housing to allow ambient air to flow into the device. The housing has an exterior surface and an interior surface, such that a channel is formed that extends from the interior surface to the exterior surface caused by the opening. The sensor is situated proximate to the interior portion of the channel such that ambient air entering the channel may contact the sensor. A conductive element is also included in the electronic device and is situated within the channel and between the opening of the interior of the channel and the sensor. A first face of the conductive element is exposed directly to the ambient air that passes over through the channel. A second surface of the conductive element is enclosed within the interior of the housing and is thermally coupled to the sensor. The sensor detects the temperature of the ambient air via the conductive element and generates a signal indicative of the temperature of the ambient temperature.

Figure 1:
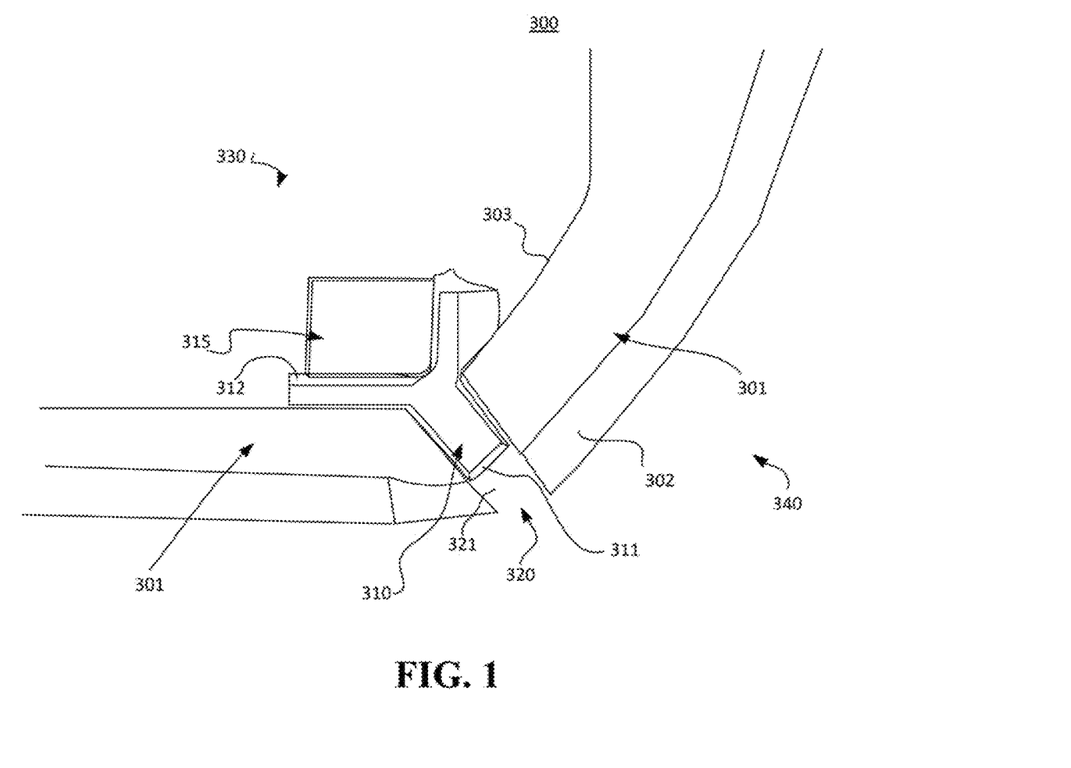
FIG. 1 shows an example illustration of a portion of a computing device according to an embodiment of the disclosed subject matter.

In an implementation of the disclosed subject matter, an electronic device is disclosed that includes a temperature sensor for determining the ambient temperature outside of the device for use by one or more applications/programs operational on the device. An example illustration of the disclosed implementation of a portion of the electronic device is illustrated in FIG. 1. The electronic device 300 comprises a housing, including a wall 301 that surrounds the device 300 to enclose the inside 330 of the electronic device 300, a sensor 315, and a conductive element 310.

The wall 301 separates the inside 330 of the electronic device from the outside environment 340. The wall 301 includes an opening 320 that extends from an exterior surface 302 of the wall 301 to an interior surface 303 of the wall 301, thereby forming a channel 321. The channel 321 allows the air of the exterior environment 340 to flow from the outside 340 of electronic device 300 to the inside 330 the electronic device 300.

Proximate to the opening of the channel 321 in the interior surface of the wall 301 is the sensor 315. The sensor 315 is positioned to measure the ambient temperature of the device 300. Thermally coupled to the conductive element 310, the sensor 315 measures the ambient air flowing in the channel via the conductive element 310, to be disclosed below. The location of the sensor 315 within the interior of the electronic device 300 exposes the element 315 to the air in the interior environment as well as the ambient air from the channel 320.

Figure 4:
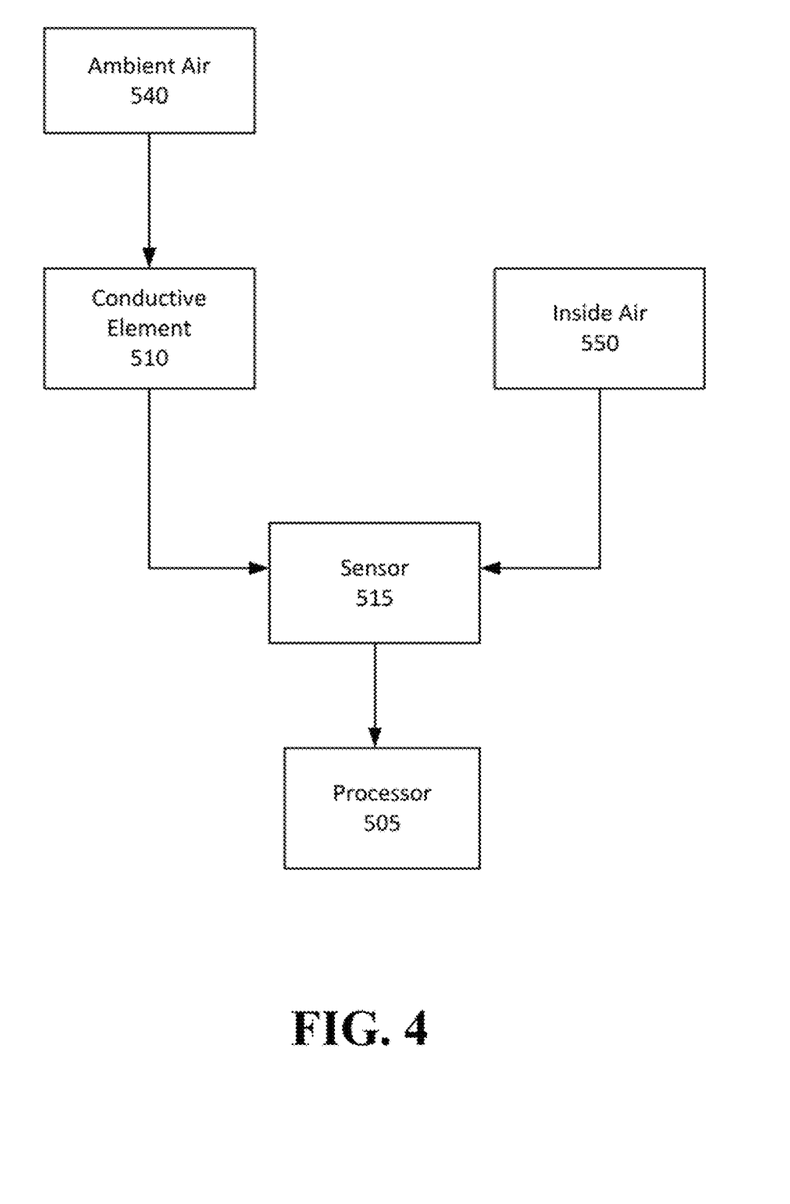
FIG. 4 shows an example block diagram of an implementation of a ambient temperature sensing system according to an embodiment of the disclosed subject matter.

The sensor 315 is coupled to a processor (not shown in FIG. 1) that receives and analyzes data obtained by the sensor 315. The processor further controls operations of other components of the electronic device 300, including those components or applications executed by the electronic device 300 that utilize the data provided by the temperature sensing device 315. The processor may be included in the sensor and/or separate from the sensor and included as a component of the electronic device 300, as illustrated in FIG. 4 (to be discussed below).

Although the sensor has been disclosed as sensing ambient temperature of the exterior environment, the sensor also may be used to sense other environmental conditions, for example, smoke and carbon monoxide. Also, the presence of the temperature sensing device 315 does not preclude the inclusion of additional sensors, environmental or otherwise, in the electronic device 300.

The conductive element 310, positioned between the sensor 315 and the channel 321, is thermally coupled to the sensor 315, acting as a thermal conductor for the ambient air. The conductive element acts as a direct conduction path between the ambient air 340 and the sensor 315. The conductive element 310 comprises a first surface 311 and a second surface 312. The second surface 312 is fully enclosed within the interior of the electronic device 300 and is the area on the conductive element 310 that is in thermal contact with the sensor 315. The first surface 311 is situated within the channel 321 and faces the exterior environment 340 through the opening 320. The first surface 313, in an implementation, has a thin anodized coating on it so that it may be painted, for aesthetic reasons, and still remain conductive. It is preferable that any painting of the first surface 311 be thin so as to not affect the thermal conductivity of the conductive element 310.

Figure 3:
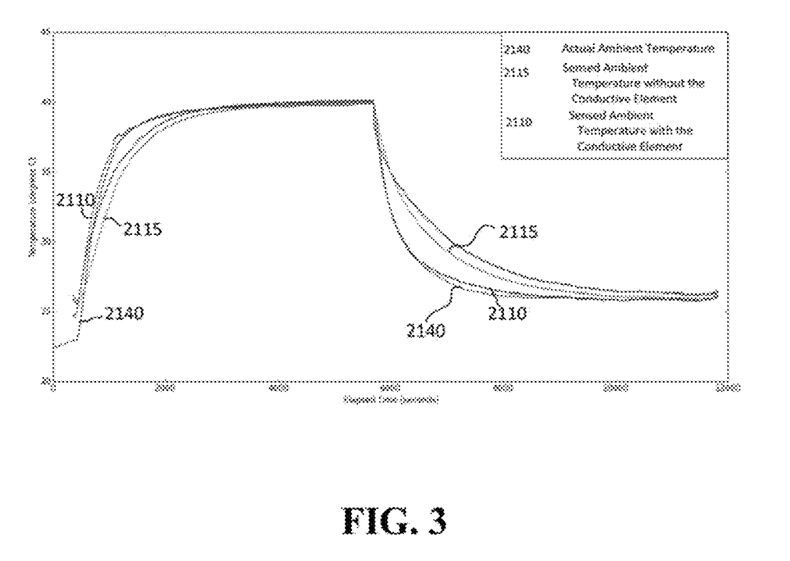
FIG. 3 shows a line graph of the improved tracking of ambient temperature according to an embodiment of the disclosed subject matter.

The conductive element may be a metal wedge, preferably shaped to fit within the channel and to be in contact with the sensor at the second portion, such that the surface area of the area of the contact point between the conductive element and the sensor is as large as possible. For example, the second portion of the conductive element may be L-shaped so that the top and left sides of the sensor are in contact with the second portion of the conductive element, as illustrated in FIG. 1. As those having skill in the art know, thermal equilibrium between the temperature of the ambient air and the disclosed conductive element is achieved at a much faster rate than the inside air would in reaching equilibrium with the ambient air. Since the ambient temperature has a much lower thermal resistance path to the sensor that the hot air inside the device, resulting in better tracking of ambient air by the sensor. An example line graph illustration the improved tracking of an implementation of the present subject matter is shown in FIG. 3. As shown, the sensed ambient temperature 2110 according to an implementation of the present implementation of the present subject matter closely tracks the actual ambient temperature 2140, as compared to the sensed ambient temperature without conductive element 2115.

The metal wedge may be made from any conductive metal for example, aluminum, copper, sheet metal, etc. In a preferred implementation, the conductive element is aluminum.

It is preferable that the conductive element and the sensor be thermally coupled/bonded using a thermal adhesive, for example, thermal paste/grease. Although a thermal adhesive has been disclosed herein, it should be noted that any thermal coupling device, compound, etc. may be used to thermally couple the sensor to the conductive element.

In the disclosed implementation, the conductive element 310 may be electrically grounded to prevent electrostatic discharge (ESD) from the conductive element 310, which could otherwise result in damage to other electrical hardware included in the electronic device 300. The conductive element 310 may be grounded using the same grounding circuit used by the other components of the electronic device 300, or a separate grounding circuit.

Figure 2:
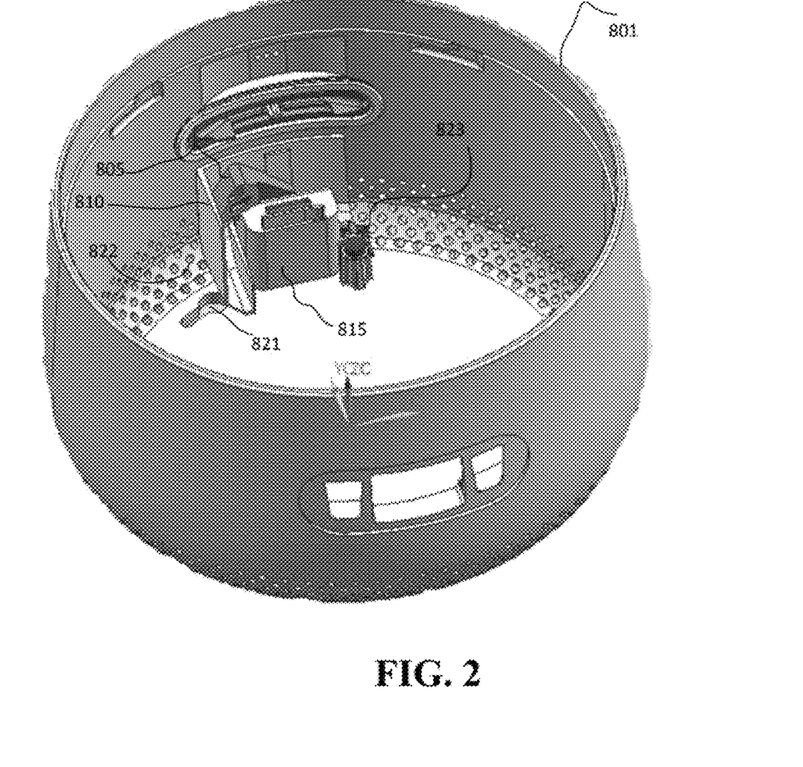
FIG. 2 shows an example illustration of a bucket including the ambient temperature sensing system according to an embodiment of the disclosed subject matter.

FIG. 2 is an example implementation of a bucket 801 that includes the ambient temperature sensing system of the present subject matter. The bucket 801 includes a conductive element 810, a grounding element 823, and a temperature sensor 815. In an implementation, the conductive element 810 is thermally coupled to the sensor 815, and electrically coupled to the grounding element 823. The grounding element 823 prevents electrostatic discharge from the conductive element 810.

According to an implementation, the conductive element 810 is seated in the bucket 801 using a slot 821 and speaker holes 822. A wide flap lip on the bottom of the conductive element 810 sits in the slot 821. The slot 821, as illustrated, is located at the bottom of the bucket 801. The speaker holes 822 are located throughout the lower portion of the bucket 801.

Figure 10:
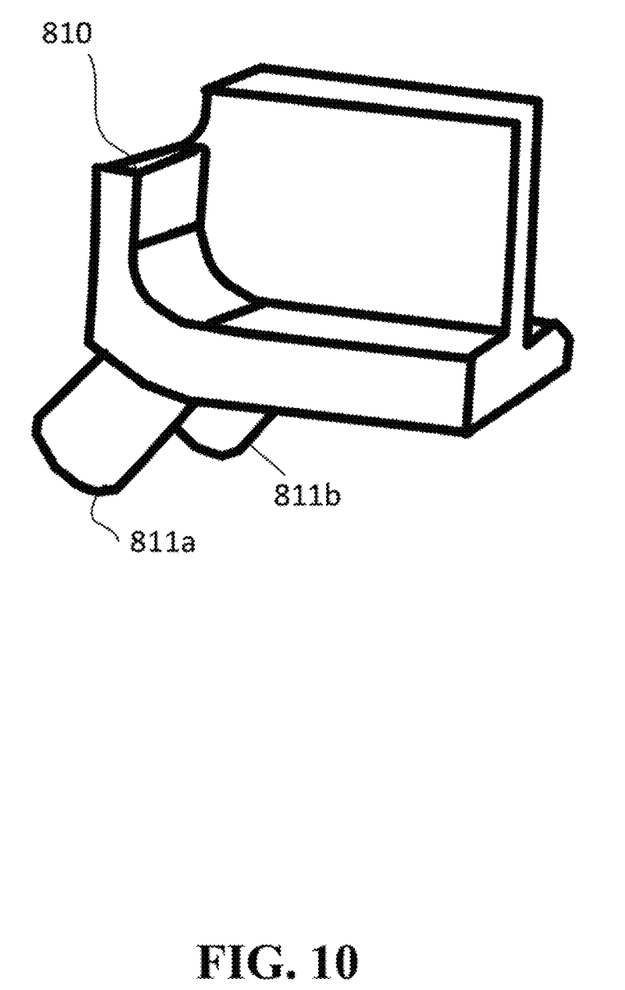
FIG. 10 shows an example conductive element according to an implementation of an embodiment of the disclosed subject matter.

Two prongs 811a, 811b of the conductive element 810, illustrated in the example conductive element 810 of FIG. 10. The two prongs 811a, 811b of the conductive element 810 slide into respective speaker holes 822. In an implementation, to fix the conductive element 810 to the bucket 801, the conductive element 810 is first sit into the slot 821, and then slid forward such that the two prongs of the conductive element 810 into two corresponding speaker holes 822. The ends of two prongs in the speaker holes 822 are exposed to the ambient air and used to measure the ambient temperature by the temperature sensor 815, as disclosed above.

An electronic flex 805 holds the temperature sensor 815 in place such that the temperature sensor 815 is thermally coupled to the conductive element 810. The electronic flex 805 is twisted and locked to ensure that the temperature sensor 815 does not lose become thermally decoupled from the conductive element 810.

Figure 5:
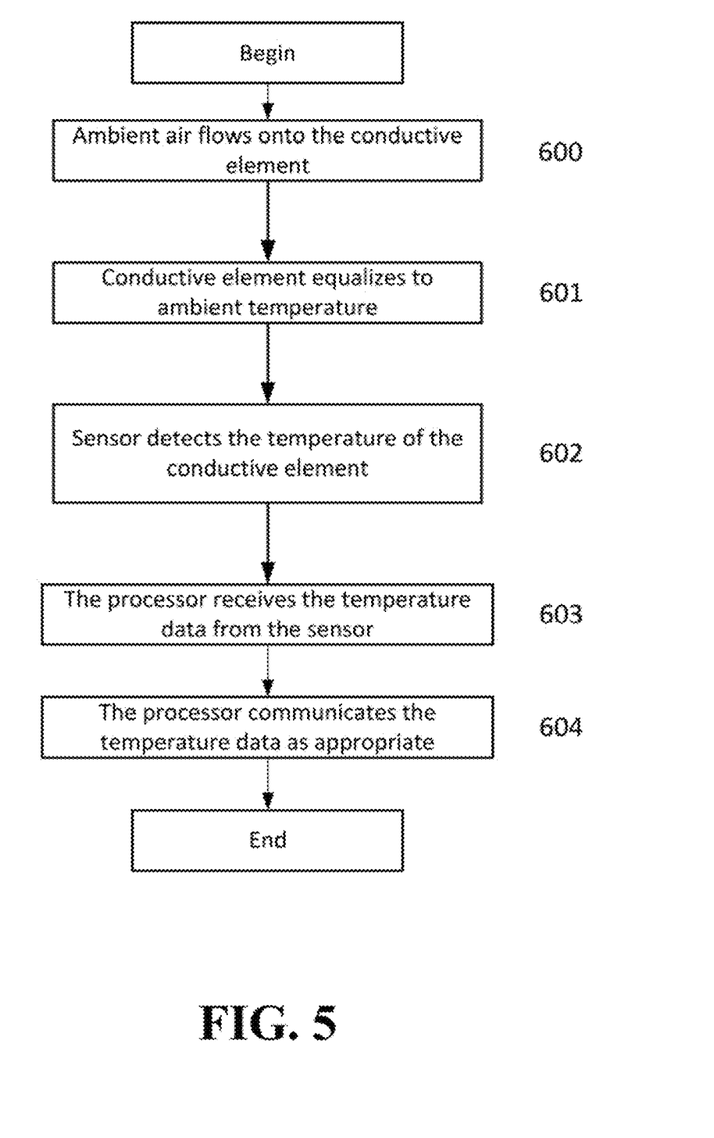
FIG. 5 shows an example flow diagram of the ambient temperature sensing system of FIG. 2.

An example block diagram and flow diagram of the disclosed implementation of the ambient temperature sensing system is illustrated in FIGS. 4 and 5, respectively. Ambient air 540 enters the opening in the housing of the electronic device and flows through the channel onto the conductive element 510 (600). The temperature of the conductive element 510 equalizes to the temperature of the ambient air in the channel (601). The sensor 515 senses the temperature of the conductive element 510 in thermal contact with the sensor 515 as well as the temperature of the air 550 inside the electronic device via a portion of the temperature sensing device that is not in thermal contact with the conductive element 510 (602).

The sensor 515 then provides the temperature data to the processor 505 (603). The processor 505 then communicates the temperature data in the appropriate manner for the electronic device. (604). The processor 505 may communicate the temperature read from the sensor 515 of the conductive element 510, or the processor 505 may receive the temperature of the conductive element 510 from the sensor 515 and process the received temperature based on an algorithm that adjusts the received temperature for the temperature inside the electronic device.

Figure 6:
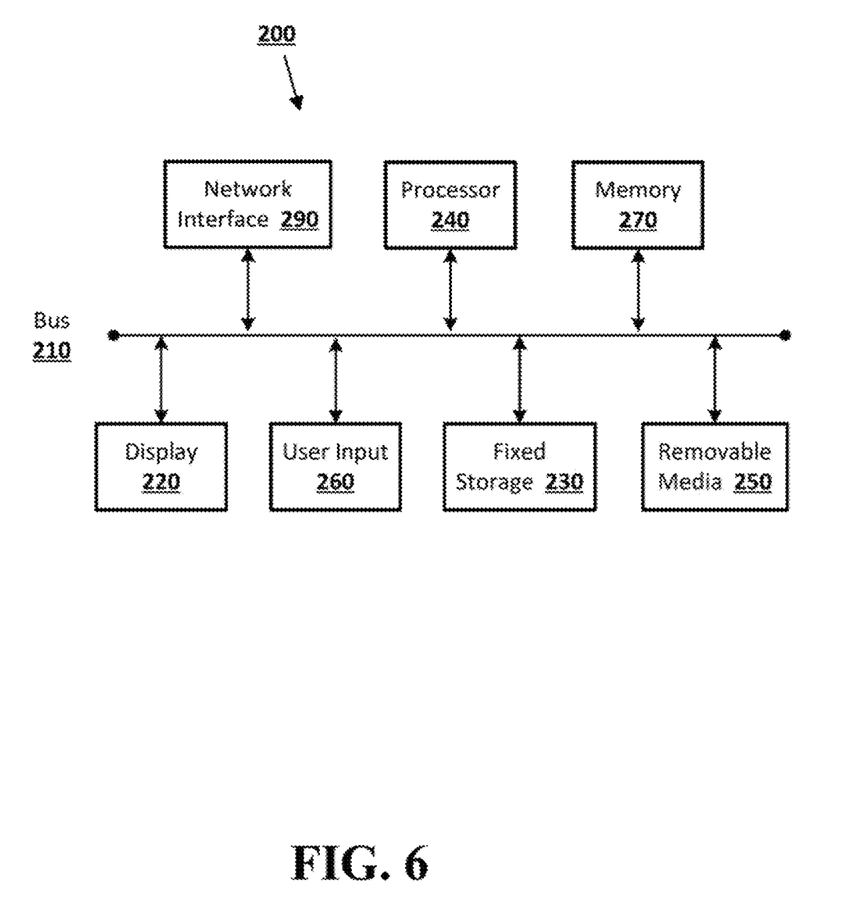
FIG. 6 shows a computing device according to an embodiment of the disclosed subject matter.

Embodiments of the presently disclosed subject matter may be implemented in and used with a variety of electronic/computing devices. FIG. 6 is an example computing device 20 suitable for implementing embodiments of the presently-disclosed subject matter. For example, the device 200 may be used to implement a controller, a device including sensors as disclosed herein, or the like. Alternatively or in addition, the device 200 may be, for example, a desktop or laptop computer, or a mobile computing device such as a smart phone, tablet, or the like. The device 200 may include a bus 210 which interconnects major components of the computing device 200, such as a central processor 240, a memory 270 such as Random Access Memory (RAM), Read Only Memory (ROM), flash RAM, or the like, a user display 220 such as a display screen, a user input interface 260, which may include one or more controllers and associated user input devices such as a keyboard, mouse, touch screen, and the like, a fixed storage 230 such as a hard drive, flash storage, and the like, a removable media component 250 operative to control and receive an optical disk, flash drive, and the like, and a network interface 290 operable to communicate with one or more remote devices via a suitable network connection.

The bus 210 allows data communication between the central processor 240 and one or more memory components 250, 270, which may include RAM, ROM, and other memory, as previously noted. Applications resident with the device 200 are generally stored on and accessed via a computer readable storage medium.

The fixed storage 230 may be integral with the device 200 or may be separate and accessed through other interfaces. The network interface 290 may provide a direct connection to a remote server via a wired or wireless connection. The network interface 290 may provide such connection using any suitable technique and protocol as will be readily understood by one of skill in the art, including digital cellular telephone, Wi-Fi, Bluetooth®, near-field, and the like. For example, the network interface 290 may allow the device to communicate with other computers via one or more local, wide-area, or other communication networks, as described in further detail herein.

Figure 7:
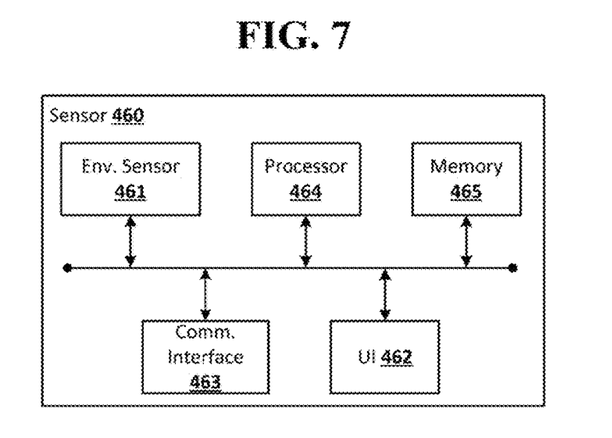
FIG. 7 shows an example block diagram of an implementation of a sensor according to an embodiment of the disclosed subject matter.

The sensor as disclosed herein may include hardware in addition to the components disclosed above. An example embodiment of a sensor that obtains information about the environment is illustrated in FIG. 7. A sensor 460 may include an environmental sensor 461, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, pressure sensor, microphone, or any other suitable environmental sensor, that obtains a corresponding type of information about the environment in which the sensor 460 is located. A processor 464 may receive and analyze data obtained by the sensor 461, control operation of other components of the sensor 60, and process communication between the sensor and other devices, e.g., a device processor (i.e., CPU). The processor 464 may execute instructions stored on a computer-readable memory 465. The memory 465 or another memory in the sensor 460 may also store environmental data obtained by the sensor 461. A communication interface 463, such as a Wi-Fi or other wireless interface, Ethernet or other local network interface, or the like may allow for communication by the sensor 460 with other devices. A user interface (UI) 462 may provide information and/or receive input from a user of the sensor. The UI 462 may include, for example, a speaker to output an audible alarm when an event is detected by the sensor 460. Alternatively, or in addition, the UI 462 may include a light to be activated when an event is detected by the sensor 460. The user interface may be relatively minimal, such as a limited-output display, or it may be a full-featured interface such as a touchscreen. Components within the sensor 460 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

The sensor may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

Figures 8, 9:
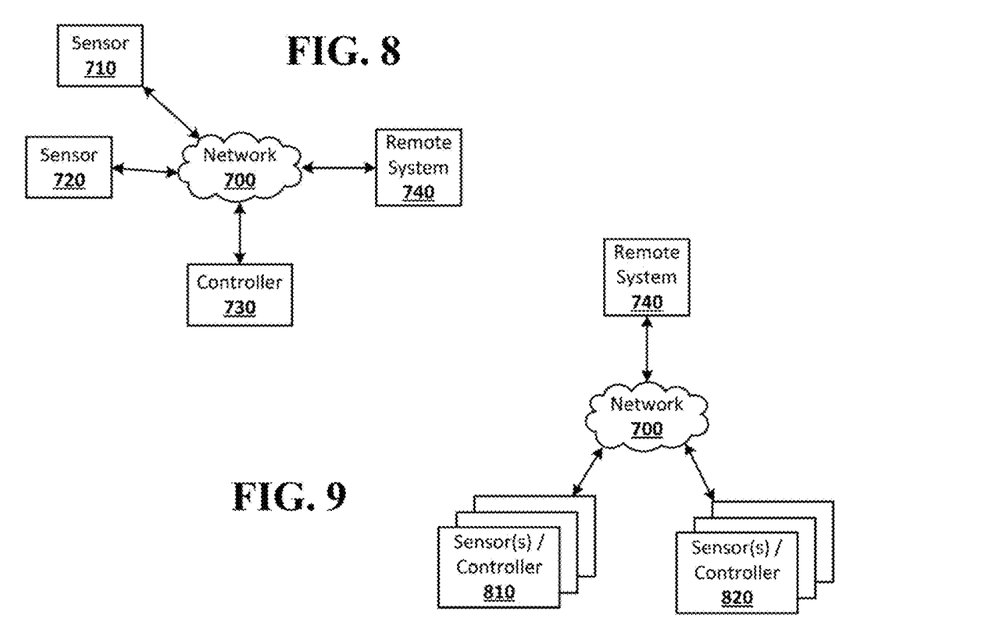
FIG. 8 shows a sensor network according to an implementation of an embodiment of the disclosed subject matter.
FIG. 9 shows a system including sensor/controller systems according to an implementation of an embodiment of the disclosed subject matter.

FIG. 8 shows an example of a sensor network, including the disclosed ambient temperature sensor, which may be implemented over any suitable wired and/or wireless communication networks. One or more sensors 710, 720 may communicate via a local network 700, such as a Wi-Fi or other suitable network, with each other and/or with a controller 730. The controller may be a general- or special-purpose computer. The controller may, for example, receive, aggregate, and/or analyze environmental information received from the sensors 710, 720. The sensors 710, 720 and the controller 730 may be located locally to one another, such as within a single dwelling, office space, building, room, or the like, or they may be remote from each other, such as where the controller 730 is implemented in a remote system 740 such as a cloud-based reporting and/or analysis system. Alternatively or in addition, sensors may communicate directly with a remote system 740. The remote system 74 may, for example, aggregate data from multiple locations, provide instruction, software updates, and/or aggregated data to a controller 730 and/or sensors 710, 720.

The sensor network shown in FIG. 8 may be an example of a smart-home environment. The depicted smart-home environment may include a structure, a house, office building, garage, mobile home, or the like. The devices of the smart home environment, such as the sensors 710, 720, the controller 730, and the network 700 may be integrated into a smart-home environment that does not include an entire structure, such as an apartment, condominium, or office space.

The smart home environment can control and/or be coupled to devices outside of the structure. For example, one or more of the sensors 710, 720 may be located outside the structure, for example, at one or more distances from the structure (e.g., sensors 710, 720 may be disposed outside the structure, at points along a land perimeter on which the structure is located, and the like. One or more of the devices in the smart home environment need not physically be within the structure. For example, the controller 730 which may receive input from the sensors 710, 720 may be located outside of the structure.

The structure of the smart-home environment may include a plurality of rooms, separated at least partly from each other via walls. The walls can include interior walls or exterior walls. Each room can further include a floor and a ceiling. Devices of the smart-home environment, such as the sensors 710, 720, may be mounted on, integrated with and/or supported by a wall, floor, or ceiling of the structure.

The smart-home environment including the sensor network shown in FIG. 6 may include a plurality of devices, including intelligent, multi-sensing, network-connected devices, that can integrate seamlessly with each other and/or with a central server or a cloud-computing system (e.g., controller 730 and/or remote system 740) to provide home-security and smart-home features. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 710, 720 shown in FIG. 8.

For example, a smart thermostat, as disclosed herein, may detect ambient climate characteristics (e.g., temperature and/or humidity) and may control an HVAC (heating, ventilating, and air conditioning) system accordingly of the structure. For example, the ambient client characteristics may be detected by sensors 710, 720 shown in FIG. 8, and the controller 73 may control the HVAC system (not shown) of the structure.

The smart thermostats and other devices of a smart-home environment (e.g., as illustrated as sensors 710, 720 of FIG. 8) can be communicatively coupled to each other via the network 700, and to the controller 730 and/or remote system 740 to provide security, safety, and/or comfort for the smart home environment).

A user can interact with one or more of the network-connected smart devices (e.g., via the network 700). For example, a user can communicate with one or more of the network-connected smart devices using a computer (e.g., a desktop computer, laptop computer, tablet, or the like) or other portable electronic device (e.g., a smartphone, a tablet, a key FOB, and the like). A webpage or application can be configured to receive communications from the user and control the one or more of the network-connected smart devices based on the communications and/or to present information about the device's operation to the user. For example, the user can view can arm or disarm the security system of the home.

One or more users can control one or more of the network-connected smart devices in the smart-home environment using a network-connected computer or portable electronic device. In some examples, some or all of the users (e.g., individuals who live in the home) can register their mobile device and/or key FOBs with the smart-home environment (e.g., with the controller 730). Such registration can be made at a central server (e.g., the controller 730 and/or the remote system 740) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

Alternatively, or in addition to registering electronic devices, the smart-home environment may make inferences about which individuals live in the home and are therefore users and which electronic devices are associated with those individuals. As such, the smart-home environment may "learn" who is a user (e.g., an authorized user) and permit the electronic devices associated with those individuals to control the network-connected smart devices of the smart-home environment (e.g., devices communicatively coupled to the network 70), in some embodiments including sensors used by or within the smart-home environment. Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols.

A smart-home environment may include communication with devices outside of the smart-home environment but within a proximate geographical range of the home. For example, the smart-home environment may include an outdoor lighting system (not shown) that communicates information through the communication network 700 or directly to a central server or cloud-computing system (e.g., controller 730 and/or remote system 740) regarding detected movement and/or presence of people, animals, and any other objects and receives back commands for controlling the lighting accordingly.

The controller 730 and/or remote system 740 can control the outdoor lighting system based on information received from the other network-connected smart devices in the smart-home environment. For example, in the event, any of the network-connected smart devices, such as smart wall plugs located outdoors, detect movement at night time, the controller 730 and/or remote system 740 can activate the outdoor lighting system and/or other lights in the smart-home environment.

In some configurations, a remote system 740, as illustrated in FIG. 6, may aggregate data from multiple locations, such as multiple buildings, multi-resident buildings, individual residences within a neighborhood, multiple neighborhoods, and the like. In general, multiple sensor/controller systems 810, 820 illustrated in FIG. 9 may provide information to the remote system 740. As illustrated in FIG. 9, the sensor/controller systems 810, 820 may provide data directly from one or more sensors as previously described, or the data may be aggregated and/or analyzed by local controllers such as the controller 730, which then communicates with the remote system 740. The remote system may aggregate and analyze the data from multiple locations, and may provide aggregate results to each location. For example, the remote system 740 may examine larger regions for common sensor data or trends in sensor data, and provide information on the identified commonality or environmental data trends to each local system 810, 820.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A device comprising:
  a housing having an exterior surface and an interior surface;
  a channel, formed through an opening in the housing from the exterior surface to the interior surface;
  a conductive element, thermally responsive to an ambient air entering the channel, comprising an external surface and an internal surface, wherein a portion of the conductive element is situated within the channel; and
  a sensor situated within the housing and thermally coupled to the conductive element, wherein the sensor is configured to determine an ambient temperature of the device based at least on a detected temperature of the conductive element.

2. The device of claim 1, wherein the device is configured to use the ambient temperature to adjust a power usage of the device.

3. The device of claim 1, wherein the device is configured to use the ambient temperature to control an HVAC system.

4. The device of claim 1, wherein the sensor is further configured to detect a temperature inside the housing of the device.

5. The device of claim 4, wherein the ambient temperature is further based on the temperature inside the housing of the device.

6. The device of claim 1,
  wherein the external surface is exposed to the ambient air of the device, and
  wherein the internal surface is thermally coupled to the sensor.

7. The device of claim 6, wherein the conductive element and the sensor are thermally coupled using a thermal adhesive.

8. The device of claim 6, wherein the conductive element is a metal wedge.

9. The device of claim 8, wherein the metal is aluminum.

10. The device of claim 8, wherein the metal is copper.

11. The device of claim 8, wherein the metal is stainless steel.

12. A system comprising:
  a plurality of sensing devices, each of the plurality of sensing devices communicatively coupled to each other; and
  a controller configured to receive an information from the each of the plurality of sensing devices, and initiate a predetermined response based on the information,
  wherein the plurality of sensing devices includes at least one temperature sensing device, the at least one temperature sensing device comprising:
    a housing having an exterior surface and an interior surface;
    a channel, formed through an opening in the housing from the exterior surface to the interior surface;
    a conductive element, thermally responsive to an ambient air entering the channel, comprising an external surface and an internal surface, wherein a portion of the conductive element is situated within the channel; and
    a sensor situated within the housing and thermally coupled to the conductive element, wherein the sensor is configured to determine an ambient temperature of the at least one temperature sensing device based at least on a detected temperature of the conductive element.

13. The system of claim 12, wherein the sensor is further configured to detect a temperature inside the housing of the at least one temperature sensing device.

14. The system of claim 13, wherein the ambient temperature is further based on the detected temperature inside the housing of the at least one temperature sensing device.

15. The system of claim 12, wherein the system is included in a smart home environment.

16. The system of claim 15, wherein the system is a sensor network.

17. The system of claim 12,
wherein the external surface of the at least one temperature sensing device is exposed to the ambient air of the at least one temperature sensing device, and
wherein the internal surface of the at least one temperature sensing device is thermally coupled to the sensor.

18. The system of claim 17, wherein the conductive element and the sensor are thermally coupled using a thermal adhesive.

19. The system of claim 17, wherein the at least one temperature sensing device further comprises a processor configured to control the ambient temperature.

20. The system of claim 17, wherein the controller is configured to receive the ambient temperature from the at least one temperature sensing device, and operate an HVAC system based on the ambient temperature.

21. The system of claim 17, wherein at least one of the plurality of sensing devices is configured to receive the ambient temperature from the at least one temperature sensing device.

22. The system of claim 17, wherein the at least one temperature sensing device is a computing device.

23. The system of claim 22, wherein the computing device is a thermostat.

24. The system of claim 22, wherein the computing device is a mobile device.

25. The system of claim 17, wherein the conductive element is a metal wedge.

26. The system of claim 25, wherein the metal is aluminum.

27. The system of claim 25, wherein the metal is copper.

28. The system of claim 25, wherein the metal is stainless steel.

* * * * *